United States Patent [19]

Abe et al.

[11] Patent Number: 5,159,188

[45] Date of Patent: Oct. 27, 1992

[54] OPTICAL RECEPTION APPARATUS USING PRISM HAVING CALDERA-SHAPED CONCAVE PORTION

[75] Inventors: Kensaku Abe; Yukimasa Yamaguchi, both of Saitama; Nobuo Kobayashi, Tokyo, all of Japan

[73] Assignee: Sony Corporation, Tokyo, Japan

[21] Appl. No.: 744,423

[22] Filed: Aug. 13, 1991

[30] Foreign Application Priority Data

Aug. 14, 1990 [JP] Japan ............... 2-214856
Jun. 7, 1991 [JP] Japan ............... 3-136603

[51] Int. Cl.$^5$ ............................... H01J 3/14
[52] U.S. Cl. ..................... 250/216; 359/831
[58] Field of Search ........ 250/216; 359/831, 833–837, 359/669, 737

[56] References Cited

U.S. PATENT DOCUMENTS

| | | | |
|---|---|---|---|
| 3,442,571 | 5/1969 | Itzkan | 359/833 |
| 3,840,738 | 10/1974 | Indig | 359/831 |
| 4,277,148 | 7/1981 | Clegg | 359/837 |
| 4,567,879 | 2/1986 | Clegg | 359/831 |
| 4,743,112 | 5/1988 | Burke | 359/737 |
| 4,915,489 | 4/1990 | Minko | 359/834 |

Primary Examiner—David C. Nelms
Assistant Examiner—S. Allen
Attorney, Agent, or Firm—Lewis H. Eslinger; Jay H. Maioli

[57] ABSTRACT

An optical reception apparatus comprises of a prism made by forming in a member of substantially the frustum of a circular cone made of a transparent material a concave portion of a substantially circular cone or substantially the frustum of circular cone whose diameter is gradually reduced in the direction from a small diameter circular outer side surface to a large diameter circular outer side surface of the frustum of the circular cone, and a light receiving element mounted on the prism at its position along a center line of a circle of the large diameter circular outer side surface and also in the vicinity of the large diameter circular outer side surface.

6 Claims, 12 Drawing Sheets

OPTICAL RECEPTION APPARATUS USING PRISM HAVING CALDERA-SHAPED CONCAVE PORTION

BACKGROUND OF THE INVENTION

1. Field of the Invention

The present invention generally relates to optical reception apparatus and, more particularly, is directed to an optical reception apparatus for use with audio apparatus, such as a cordless speaker, a cordless microphone system or the like.

2. Description of the Prior Art

A known small and simple active speaker houses a battery-driven power amplifier within a speaker box and supplies an audio signal from a signal source to a speaker apparatus by means of a light. FIG. 1 shows in block form an example of a circuit arrangement of such speaker apparatus previously proposed by the assignee of the present application, and circuit elements and parts shown in FIG. 1 are all housed in the speaker box.

Referring to FIG. 1, shown at 1 is a light receiving device including a light receiving element, for example, a photodiode. The light receiving device 1 faces to the outside of the speaker box and receives an infrared light LT from a transmitter (not shown).

In this case, the infrared light LT is a signal light modulated by an audio signal SA. More specifically, the audio signal SA is converted into an FM (frequency-modulated) signal FT whose carrier frequency is 2.3 MHz and whose maximum frequency deviation falls within a range of ±150 kHz. The FM signal FT is supplied to an infrared LED (light emitting diode) together with a DC bias and the infrared LED derives the infrared light LT whose intensity (brightness) is modulated by the signal FT. The intensity of the infrared light LT becomes zero or substantially zero in the negative peak portion of the signal FT.

Further, the light receiving device 1 is connected with a coil provided at the input side of a bandpass filter 2 in a DC connection fashion, and the resultant DC circuit is connected through a de-coupling circuit 3 to a power supply battery 9.

The bandpass filter 2 is of $\pi$ type bandpass filter and has a pass band corresponding to the FM signal FT. Also, the battery 9 is formed of four dry batteries connected in series, i.e., 6 V. Accordingly, when receiving the infrared light LT from the transmitter (not shown), the light receiving device 1 derives the FM signal FT and supplied to the bandpass filter 2.

The FM signal FT from the bandpass filter 2 is supplied through a high frequency amplifier 4 to an FM receiving circuit 5. The FM receiving circuit 5 is formed of one-chip IC (integrated circuit) that is utilized by the standard FM receiver and includes circuit elements ranging from the high frequency amplifier to an FM demodulating circuit. Accordingly, in the FM receiving circuit 5, the signal FT is converted into an intermediate frequency signal having a frequency of 10.7 MHz and this intermediate frequency signal is FM-demodulated to provide the original audio signal SA. Then, the audio signal SA is supplied through a variable resistor 6 for adjusting a sound level and a power amplifier 7 to a speaker 8. A muting signal SM is supplied from the receiving circuit 5 to the power amplifier 7 so that, when the FM signal FT is not supplied to the receiving circuit 5, the power amplifier 7 is muted by the muting signal SM.

In order to control the power supply to the above circuits 4, 5 and 7, the following arrangement is required.

As shown in FIG. 1, an emitter-collector path of a power supply switch transistor 27 is connected in series between the battery 9 and the power supply line of the circuits 4, 5 and 7.

The signal FT from the bandpass filter 2 is supplied to a detecting circuit 10, and in this example, the detecting circuit 10 is formed of a narrow band AM receiving circuit. The voltage of the battery 9 is supplied to the detecting circuit 10 as an operation voltage without being switched by the power supply switch.

The signal FT from the bandpass filter 2 is supplied through a high frequency amplifier 11 to a $\pi$-type tuning circuit 12 which is tuned with the signal FT. A negative impedance converting circuit 13 is connected to the output end of the tuning circuit 12 and an equivalent parallel resistance of the tuning circuit 12 is canceled by the negative input impedance indicated by the negative impedance converting circuit 13 so that the band width of the tuning circuit 12 falls within a range of 15 to 20 kHz.

Accordingly, the FM signal FT supplied to the tuning circuit 12 is slope-detected thereby and a detected signal DL is produced from the negative impedance converting circuit 13. Then, the detected signal DL is supplied through an amplifier 14 to an AM detecting circuit 15, from which there is derived a secondary harmonic signal HL of the audio signal SA. The secondary harmonic signal HL is supplied through a DC component reproducing circuit 21 to the base of a transistor 22.

Thus, when receiving the infrared signal LT, the optical reception device 1 derives the signal FT so that the transistor 22 is turned on by the signal HL. When not, the optical reception device 1 derives no signal FT and therefore the signal HL is not produced, thereby the transistor 22 being turned off.

When the infrared light LT is received by the optical reception device 1 and then the transistor 22 is turned on, whereby a transistor 24 is turned on and a transistor 25 is also turned on. When the transistor 25 is turned on, a transistor 26 is turned on and the transistor 27 is also turned on.

Accordingly, the voltage of the battery 9 is supplied through the transistor 27 to the circuits 4, 5 and 7, i.e., the power supply is turned on. Therefore, as described above, the amplifier 4 derives the FM signal FT, the receiving circuit 5 derives the audio signal SA and the audio signal SA is supplied through the amplifier 7 to the speaker 8. At that time, an LED 28 emits a light, indicating that the power supply is in its ON state.

However, when the transmitter (not shown) stops the transmission of the infrared light LT, then the infrared light LT is not received by the light receiving device 1 any more and the transistor 22 is turned off, whereby the transistor 24 is turned off and the transistor 25 is also turned off. When the transistor 25 is turned off, the transistor 26 is turned off and the transistor 27 is also turned off.

In that event, even when the transistor 22 is turned off, the transistor 25 is kept in its ON state during, for example, one minute by means of a time constant circuit 23 after the transistor 22 is turned off. Therefore, the power switch can be prevented from being turned off immediately after the transmission of the infrared light LT to the optical reception device 1 is temporarily interrupted by the obstacle or the like.

Further, at that time, since the FM signal FT is not supplied to the receiving circuit 5, the receiving circuit 5 derives a limiter noise. At that time, the amplifier 7 is muted by the muting signal SM, thereby preventing the limiter noise from being produced from the speaker 8.

As described above, according to the above speaker apparatus, a reproduced sound can emanate from the speaker without the power supply cord and the signal cord supplied thereto.

The above light receiving device 1 is generally constructed as shown in FIG. 2.

Referring to FIG. 2, it will be seen that a light receiving element 1C such as a photodiode or the like is shielded by a shielding member M of flat-box like configuration formed by molding a transparent plastic resin. Two connection terminals 1T, 1T are led out through the shielding member 1M in parallel to each other. In this case, of the planes of the shielding member 1M, the upper plane is utilized as a light receiving plane 1R for receiving the incident light (infrared light) LT, and the direction perpendicular to the light receiving plane 1R is selected as the front axis direction ($\theta=0$ degree). Accordingly, the light receiving element 1C exhibits unidirectivity relative to the incident light LT as shown in FIG. 3. That is, the light receiving element 1C has sensitivity for the incident light LT whose incident angle lies in a range of substantially $|\theta| \leq 60°$ and has no sensitivity substantially relative to the incident light LT which becomes incident from the lateral direction ($|\theta|=90°$).

Since the above-described speaker apparatus employs the light receiving device 1 shown in FIG. 2, this speaker apparatus produces a dead angle relative to the infrared light LT emitted from the transmitter, which unavoidably restricts the place where the speaker apparatus is installed.

To obviate this shortcoming, it is proposed to locate a lens 1L in front of the light receiving device 1 as shown in FIG. 4. This proposal, however, is not so effective because directivity is intensified to widen the dead angle although sensitivity in the front surface direction is increased as shown in FIG. 5.

Further, because the light receiving device 1 exhibits sensitivity relative to the front surface direction in a range of from ±60°, it is proposed to dispose three light receiving devices 1, 1 and 1, each having the same characteristic, in an angular displacement of 120 degrees each to thereby provide a non-directional light receiving device. In this case, however, the three light receiving devices 1, 1, 1 are needed, which unavoidably increases a manufacturing cost and which also degrades the space factor. Further, even when the three light receiving devices 1, 1, 1 are disposed as described above, the light receiving device is unavoidably arranged to have unidirectivity within the plane perpendicular to the sheet of drawing. As a consequence, if the light receiving device is arranged as a stereoscopic (or spherical) non-directional optical reception device, a larger number of light receiving devices must be combined, which cannot be realized in actual practice.

OBJECTS AND SUMMARY OF THE INVENTION

Accordingly, it is an object of the present invention to provide an improved optical reception apparatus in which the aforementioned shortcomings and disadvantages encountered with the prior art can be eliminated.

More specifically, it is an object of the present invention to provide an optical reception apparatus which can be made non-directional for receiving a light signal by a simple arrangement from a stereoscopic standpoint.

It is another object of the present invention to provide an optical reception apparatus which can solve the problem such that a cordless appliance to which the present invention is applied is installed on the very restricted place.

It is a further object of the present invention to provide an optical reception apparatus by which an information can be satisfactorily transmitted between the information transmitting side and the information receiving side of a cordless appliance to which the present invention is applied.

As a first aspect of the present invention, an optical reception apparatus for receiving a light signal comprises of a prism formed of a central portion of a mountain configuration made of a transparent material and a concave portion of a caldera configuration formed at the central portion, and a light receiving element located at a bottom portion of the mountain portion along a central axis of the caldera portion.

In accordance with a second aspect of the present invention, an optical reception apparatus comprises of a prism having a member of substantially the frustum of a circular cone made of a transparent material and a concave portion of a substantially circular cone or substantially the frustum of a circular cone whose diameter is gradually reduced in the direction from a small diameter circular side surface to a large diameter circular side surface of the frustum of a circular cone, and a light receiving element mounted on the prism at its position along a center line of a circle of the large diameter circular side surface and also in the vicinity of the large diameter circular side surface.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Before describing the preferred embodiments of the present invention, the fundamental principle of the optical reception apparatus according to this invention will be initially described with reference to FIG. 7. In FIG. 7, like parts corresponding to those of FIGS. 2 through 6 are marked with the same references and therefore need not be described in detail.

As shown in FIG. 7, a triangular prism PRSM is located with its bottom surface parallel to the light receiving surface 1R of the light receiving device 1 in a close or opposing fashion. Then, a part of the incident light LT on the triangular prism PRSM is refracted thereby and then becomes incident on the optical reception device 1 as shown by a solid or broken line in FIG. 7. Accordingly, at that time, if a vertex angle $\phi$ or the like of the prism PRSM is properly selected, then an incident angle of incident light on the light receiving device 1 can fall within a range of $\theta = \pm 60°$, that is, within a range in which the light receiving device 1 exhibits sensitivity.

From FIG. 7, it is clear that the incident angle of the light LT incident on the triangular prism PRSM is beyond of the range of $\theta = \pm 60°$ as viewed from the light receiving device 1. Also, at that time, the light receiving device 1 exhibits sensitivity for a light incident thereon from the front ($\theta = 0°$) and which does not pass through the prism PRSM. Accordingly, if the prism PRSM is disposed as shown in FIG. 7, then as viewing from the light receiving device 1, the incident angle in which the light receiving device 1 exhibits sensitivity is equivalently increased.

From the above standpoint, the present invention is intended to widen the incident angle of the incident light on the light receiving device 1 equivalently.

A first embodiment of the optical reception apparatus according to the present invention, which is applied to the speaker apparatus, will now be described with reference to FIG. 8.

Figure 8:
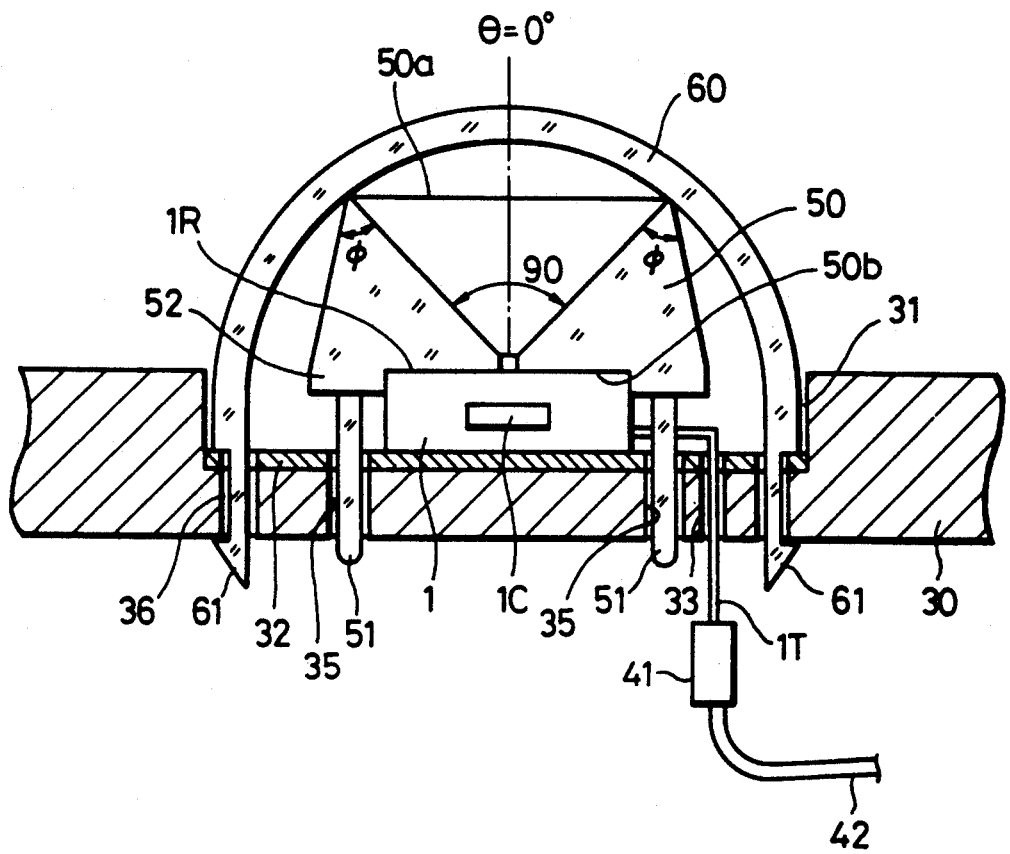
FIG. 8 is a cross-sectional view illustrating a first embodiment of an optical reception apparatus according to the present invention.

Referring to FIG. 8, a cabinet (casing) 30 for a speaker apparatus is made of a plastic material and has a circular recess portion 31 formed on a part of the outside thereof. A cushion member 32 of a sheet-like configuration is attached to the bottom surface of the circular recess portion 31 and an optical reception device 1 including the light receiving element 1C such as a photodiode or the like is mounted on the bottom of the circular recess portion 31 in the cabinet 30 via the cushion member 32. In that case, the light receiving device 1 is disposed so that the front axis direction ($\theta = 0°$) thereof is extended outwardly in the direction perpendicular to the cabinet 30. Further, connection terminals 1T, 1T of the optical reception device 1 are bent on the mid way thereof and introduced through through-holes 33, 33 bored through the cusion member 32 and the cabinet 30 into the inside of the cabinet 30.

Figure 1:
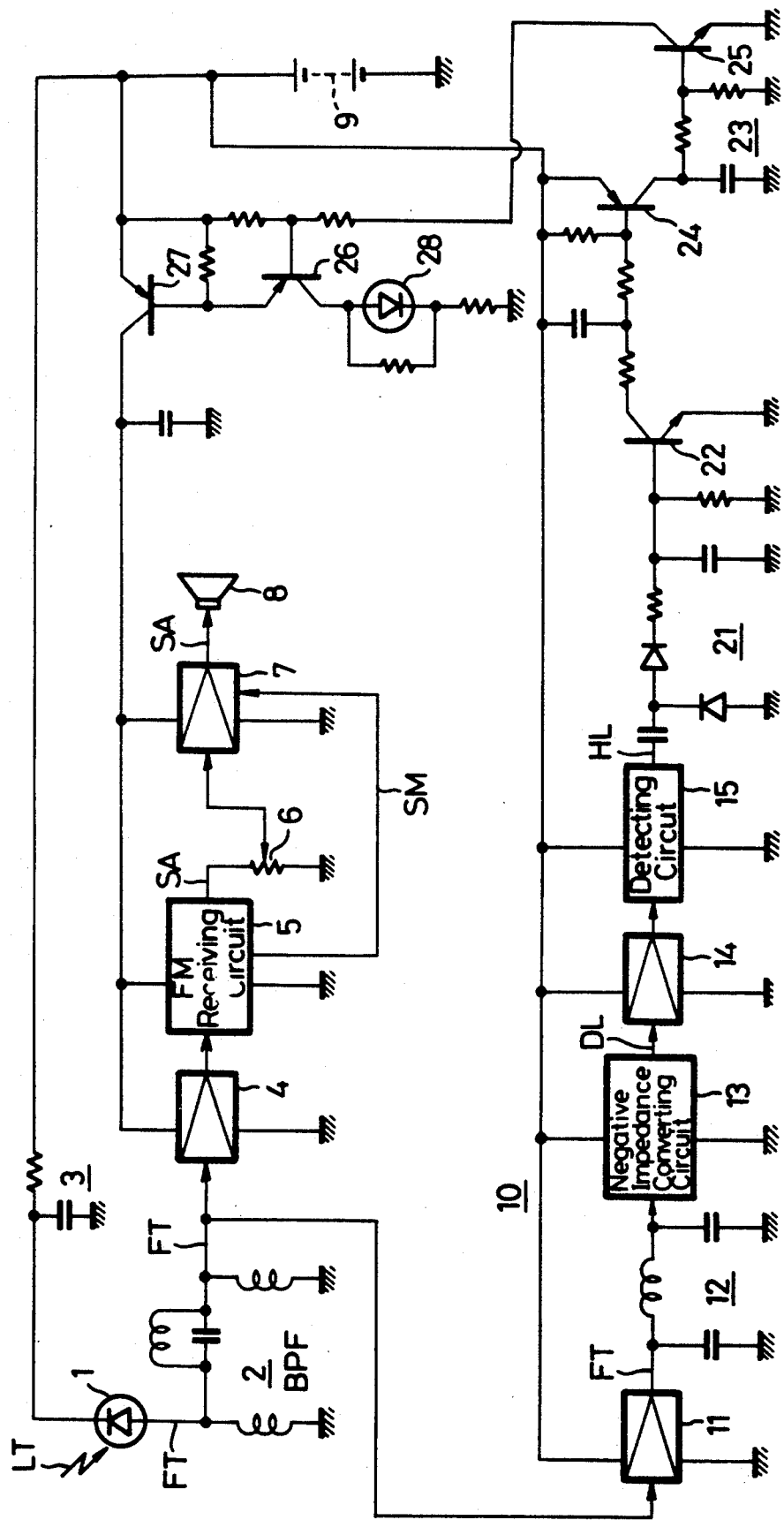
FIG. 1 is a schematic block diagram showing an example of an optical reception apparatus which is applied to a speaker apparatus.

The connection terminals 1T, 1T extended into the inside of the cabinet 30 are connected with a connector 41 and this connector 41 is connected to the speaker apparatus by way of a lead wire 42 as shown in FIG. 1.

Figure 9:
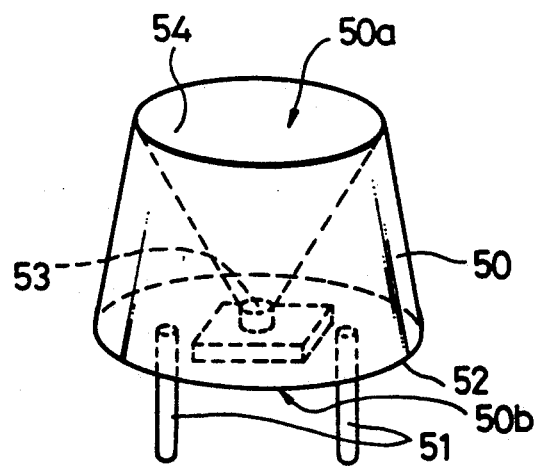
FIG. 9 is a perspective view of a main portion of the first embodiment of the optical reception apparatus according to the present invention.

A prism 50 corresponding to the prism PRSM shown in FIG. 7 is disposed in front of the light receiving surface 1R of the optical reception device 1. As shown in FIG. 9, the prism 50 is formed such that a concave portion of a caldera configuration is formed at a central portion of a mountain configuration made of a transparent material such as an acrylic resin or the like. That is, the prism 50 is generally formed as substantially the frustum of a circular cone and a concave portion 54 is formed at the central portion of the prism 50. This concave portion 54 of a substantially circular cone or substantially the frustum of a circular cone has a diameter which is gradually reduced in the direction from a small diameter circular outer side surface, that is, an upper surface 50a to a large diameter circular outer side surface, that is, a bottom surface 50b of the frustum of circular cone. In this case, a central aperture 53 is formed, which communicates the top of the concave portion 54 and the bottom surface 50b and is in a range of from 1 mm to 0.5 mm in diameter, the outer diameter of the bottom portion 50b is 11.8 mm, the vertex angle $\phi$ of the triangle in cross section is 55° and the angle formed by the inside surfaces with respect to each other is 90°.

A pair of leg portions 51, 51 are unitarily formed on the bottom surface 50b of the prism 50 and the leg portions 51, 51 are fitted into the through-holes 35, 35 bored through the cushion member 32 and the cabinet 30. Further, a convex portion 52 of, for example, a frame configuration is formed on the bottom surface 50b of the prism 50 and the prism 50 is located so that this convex portion 52 is located around the light receiving device 1 as shown in FIG. 8. Accordingly, the position of the prism 50 relative to the cabinet 30 is defined by the leg portions 51, 51 and the position of the light receiving device 1 is defined by the convex portion 52 and the terminals 1T.

As shown in FIG. 8, an optical filter 60 is disposed in front of the prism 50 and the optical filter 60 is adapted to pass therethrough the infrared light LT and to block other light of undesirable wavelengths. To this end, the optical filter 60 is designed as a hemispherical dome which has a pair of L-letter or J-letter shaped leg portions 61, 61 unitarily formed on the edge portion thereof. These leg portions 61, 61 are fitted into through-holes 36, 36 bored through the cushion member 32 and the cabinet 30 and the tops of these leg portions 61, 61 prevent the optical filter 60 from being dropped from the cabinet 30.

Furthermore, at that time, the inner circumferential surface of the optical filter 60 is brought in contact with the upper edge of the prism 50 and hence the optical filter 60 pushes the prism 50 toward the cabinet 30 side so that the prism 50 and the light receiving device 1 are secured. Also, the prism 50 and the light receiving device 1 are prevented from being moved unintentionally by the cushion member 32.

Figure 10:
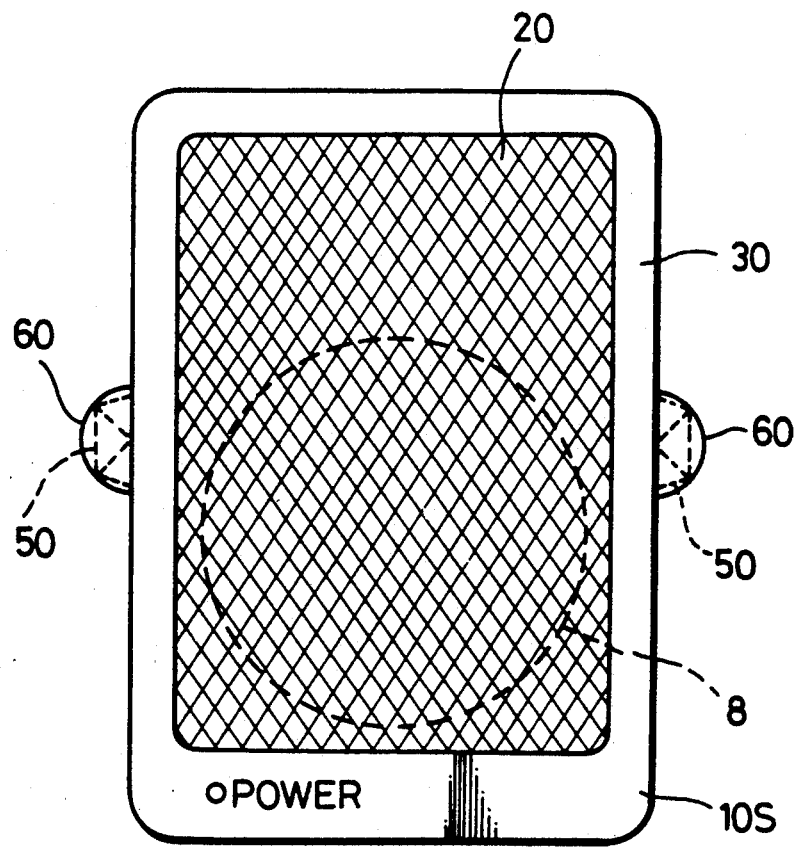
FIG. 10 is a front view illustrating an example of a speaker apparatus to which the optical reception apparatus of the present invention is applied.

As shown in FIG. 10, a pair of the above optical reception apparatus are disposed at left and right sides of the cabinet 30 of the speaker apparatus 10S, that is, the optical reception apparatus are disposed so that their front axis directions are reversed to each other. The two light receiving devices 1, 1 are connected in parallel to each other as shown in FIG. 1. In FIG. 10, reference numeral 20 designates a protecting metal net mounted on the front surface of the speaker 8.

According to the above arrangement, since each prism 50 is made annular and the light receiving device 1 is located at the center of such annular prism 50, the prisms similar to FIG. 7 are disposed at both sides of the light receiving device 1 in an arbitrary section including the front axis (e.g., section of FIG. 8).

Figure 11:
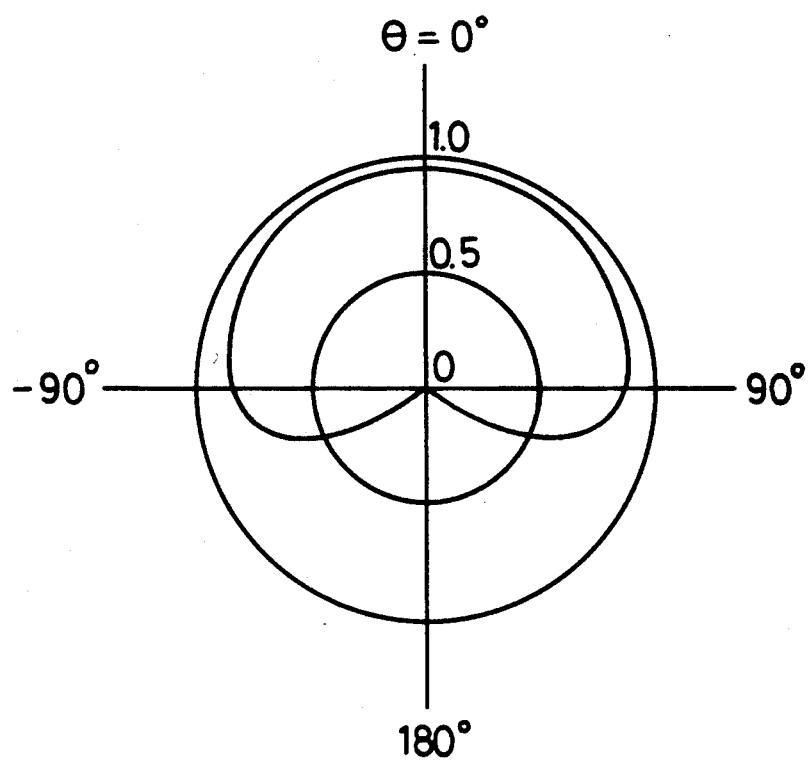
FIG. 11 is a graph of directivity to which references will be made in explaining the first embodiment of the optical reception apparatus according to the present invention.

As a consequence, the directivity of the optical reception apparatus in its section is presented as shown in FIG. 11 so that sensitivity can be obtained in the range of over $\theta = \pm 90°$. This directivity can be obtained in any sections including the front axis and a characteristic, which results from rotating the directivity of FIG. 11 about the front axis, becomes the entire directivity, that is, hemispherical directivity. Therefore, this optical reception apparatus can present sensitivity for the infrared light incident on the optical filter 60 from any direction.

Since this optical reception apparatus of the present invention is disposed at both sides of the speaker apparatus as shown in FIG. 10 and the respective light receiving devices 1, 1 are connected in parallel to each other as described above, directivities of the two optical reception apparatus are synthesized to provide a spherical directivity on the whole. That is, the optical reception apparatus becomes non-directional from a stereoscopic standpoint and has no dead angle against the infrared light LT.

As described above, according to this embodiment, the directivity of the optical reception apparatus of the present invention becomes non-directional against the infrared light LT. In this case, particularly, according to this embodiment, the annular prism 50 is formed around the light receiving device 1 so as to make the optical reception apparatus non-directional so that a large number of light receiving devices such as photodiodes are not needed. Further, since the annular prism 50 is formed by the plastic molding-process, the optical reception apparatus can be made very inexpensive and also, the space for mounting the same can be reduced.

Furthermore, since the optical reception apparatus of this embodiment can present the hemispherical or spherical directivity, the optical reception apparatus of this embodiment can be mounted to the speaker apparatus or the like with a large freedom.

Figure 12:
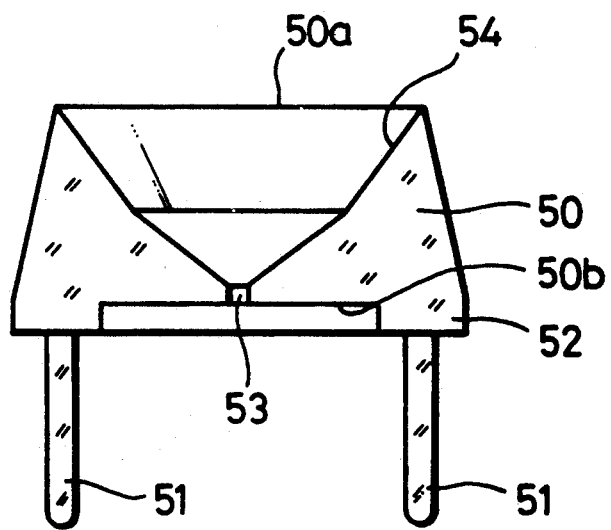
FIG. 12 is a cross-sectional view showing another example of the main portion of the optical reception apparatus of the present invention.
Figure 13:
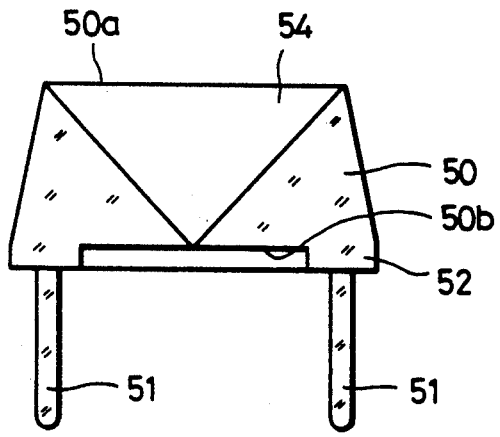
FIG. 13 is a cross-sectional view showing a further example of the main portion of the optical reception apparatus according to the present invention.

FIGS. 12 and 13 are respectively cross-sectional views illustrating other examples of the prism 50. In the example of FIG. 12, the inner surface (surface from which the infrared light LT is emitted) of the prism 50 is not flat but curved in a dogleg fashion. Accordingly, the directivity can be adjusted by the courved degree of the inner surface of the prism 50.

Further, in the example of FIG. 13, the prism 50 is made of a transparent material and generally formed as a frustum of circular cone and a concave portion 54 of inverted circular cone is formed at the center of the prism 50. The cross section of this prism 50 is triangular but the prism has no central aperture 53, unlike the prism 50 of FIGS. 8, 9 or FIG. 12. In the case of the prism 50 of FIG. 13, the central portion thereof is reduced in thickness so that the mechanical strength thereof is reduced, thus requiring this prism 50 to be handled with care.

While the light receiving element IC receives the infrared light LT modulated by the audio signal SA as described above, the present invention can be applied to the case such that the light receiving element 1C is designed so as to receive an infrared light of a remote control signal. Alternatively, the circuit of, for example, FIG. 1 may be provided in the headphone and the speaker 8 may be replaced with an acoustic transducing unit of the headphone.

Figure 14:
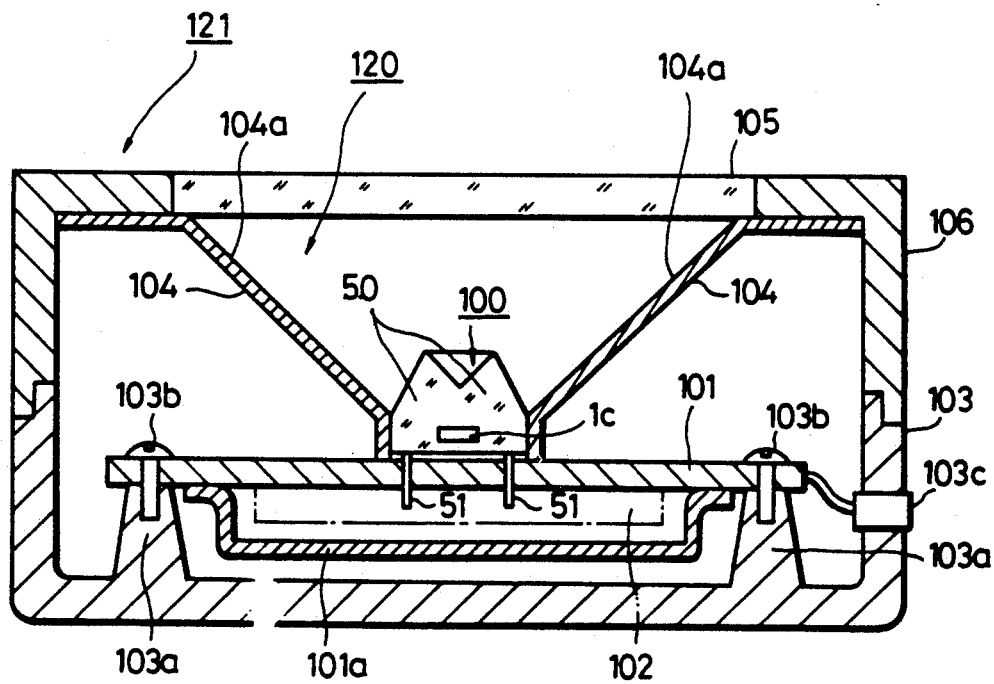
FIG. 14 is a cross-sectional view illustrating a second embodiment of the optical reception apparatus according to the present invention.

FIG. 14 shows a second embodiment of the optical reception apparatus according to the present invention, and the second embodiment of the present invention will now be described with reference to FIG. 14.

In the embodiment of FIG. 14, the prism 50 and the shielding member 1M (see FIG. 2) which mechanically and chemically protects the light receiving element 1C are not formed independently but they are formed as a molding member 100 by means of the molding-process of a transparent resin. As the method for molding this molding member 100, a potting method is used to obtain the molding member 100. According to this potting method, for example, a transparent liquid epoxy resin is filled in a mold, reacted and cured during a time period of about 24 hours, thereby the molding member 100 shown in FIG. 14 being obtained.

The molding member 100 is mounted on one surface of a substrate 101 by the leg portions 51, 51 and electrically connected with other circuit 102 such as a demodulating circuit or the like mounted on the a surface of the substrate 101. The other surface of the substrate 101 is shielded by a shielding member 101a.

Further, as shown in FIG. 14, a reflector 104 of, for example, a circular cone configuration is mounted on one surface of the substrate 101 so as to surround the molding member 100 and a mirror surface portion 104a is formed on the inside of the reflector 104 by means of, for example, a plating-process on the glass. The substrate 101 on which the molding member 100, the reflector 104 and the circuit 102 are mounted is secured to a casing body 103 made of, for example, resin by some suitable means such as screws 103b to screw portions 103a formed on the casing body 103. In this case, the molding member 100, the substrate 101, the reflector 104 and the circuit 102 constitute a reception apparatus unit 120. A connector 103c is mounted on the right side wall of the casing body 103 and this connector 103c is electrically connected with the substrate 101. Further, the substrate 101 is electrically connected to external appliances via the connector 103c, whereby a signal from the circuit 102 mounted on the substrate 101 is supplied to the external appliances or the power from the outside is supplied to the circuit 102 or the like of the substrate 101. Alternatively, the power from the outside is not necessarily supplied to the substrate 101 but a battery (not shown), for example, may be housed within the casing body 103 and the circuit 102 or the like of the substrate 101 may be powered by this battery.

In FIG. 14, reference numeral 106 designates a lid and a filter 105 is formed of the lid 106 at its front surface portion corresponding to the opening portion of the reflector 104 mounted on the substrate 101. The lid 106 is attached to the casing body 103 which houses the substrate 101 on which the reflector 104, the molding member 100 and the circuit 102 are mounted. At that time, as shown in FIG. 14, the outside portion of the opening portion of the reflector 104 is secured to the inner surface of the lid 106. Thus, an optical reception apparatus 121 is constructed.

Figure 15:
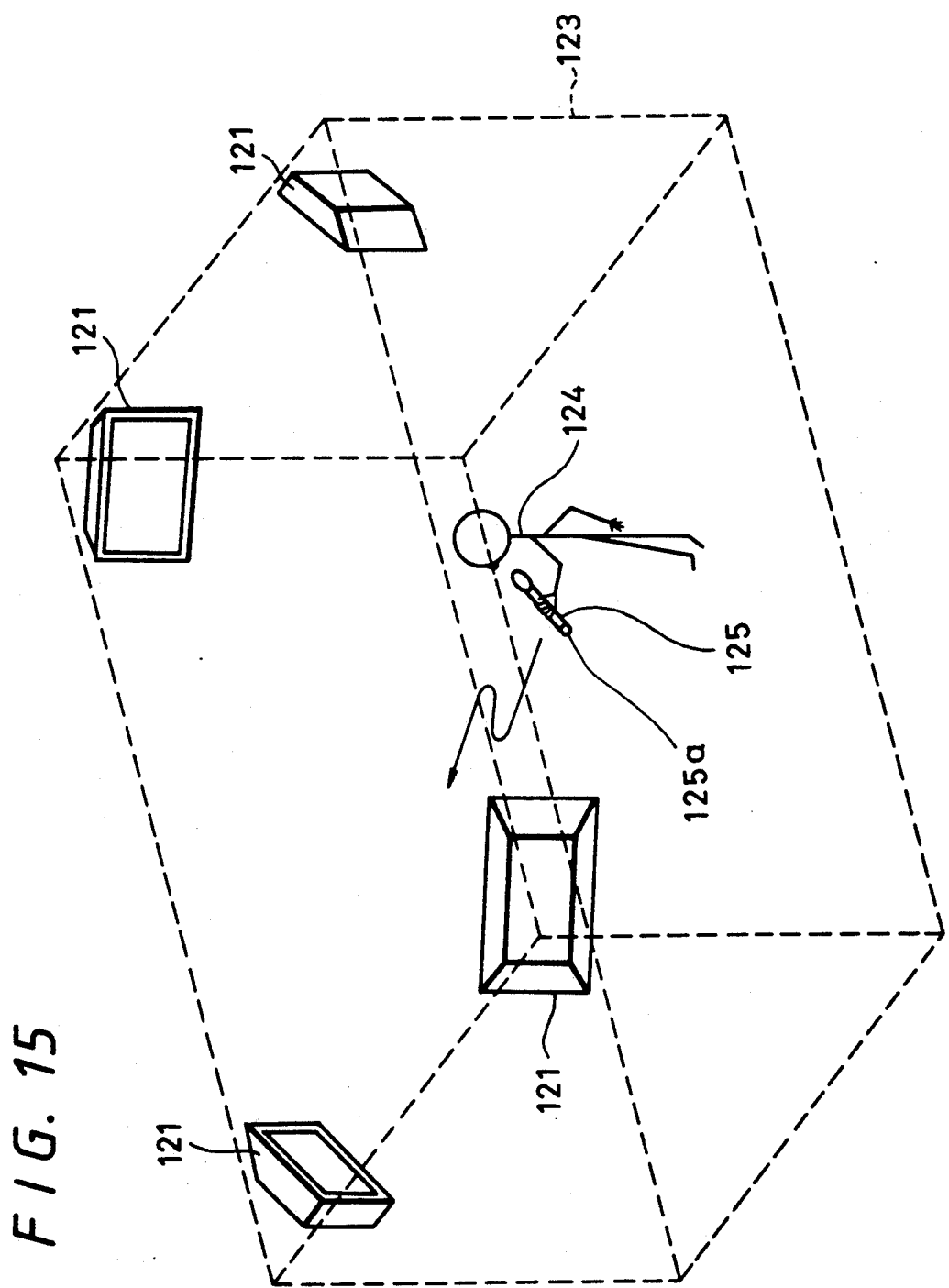
FIG. 15 is a pictorial representation used to explain the example in which the optical reception apparatus of the present invention is applied to a microphone system.

Let us now describe the case such that the above optical reception apparatus 121 is applied to a microphone system, for example, shown in FIG. 15.

In FIG. 15, reference numeral 123 designates a space such as a room or the like, and the optical reception apparatus 121 shown in FIG. 14 is installed on each of the four corners of the space 123. FIG. 15 is a pictorial representation such that a user 124 is singing a song or talking in the space 123 with a microphone 125 having a light emitting portion 125a. The microphone 125 picks up a sound of the song or talk of the user 124, converts this sound into an electrical signal and modulates the thus converted electrical signal (audio signal) by a predetermined format, thereby the modulated electrical signal being transmitted through the light emitting portion 125a as a light signal. The audio signal converted to the light signal is received by the optical reception apparatus 121 installed on the four corners of the space 123. The light signal of the audio signal thus received by the optical reception apparatus 121 is photoelectric-converted, demodulated, fed to external appliances (so-called amplifiers and speakers connected to these amplifiers) coupled, for example, to the optical reception apparatus 121, and sound, for example, is reinforced by these external appliances.

Figure 16:
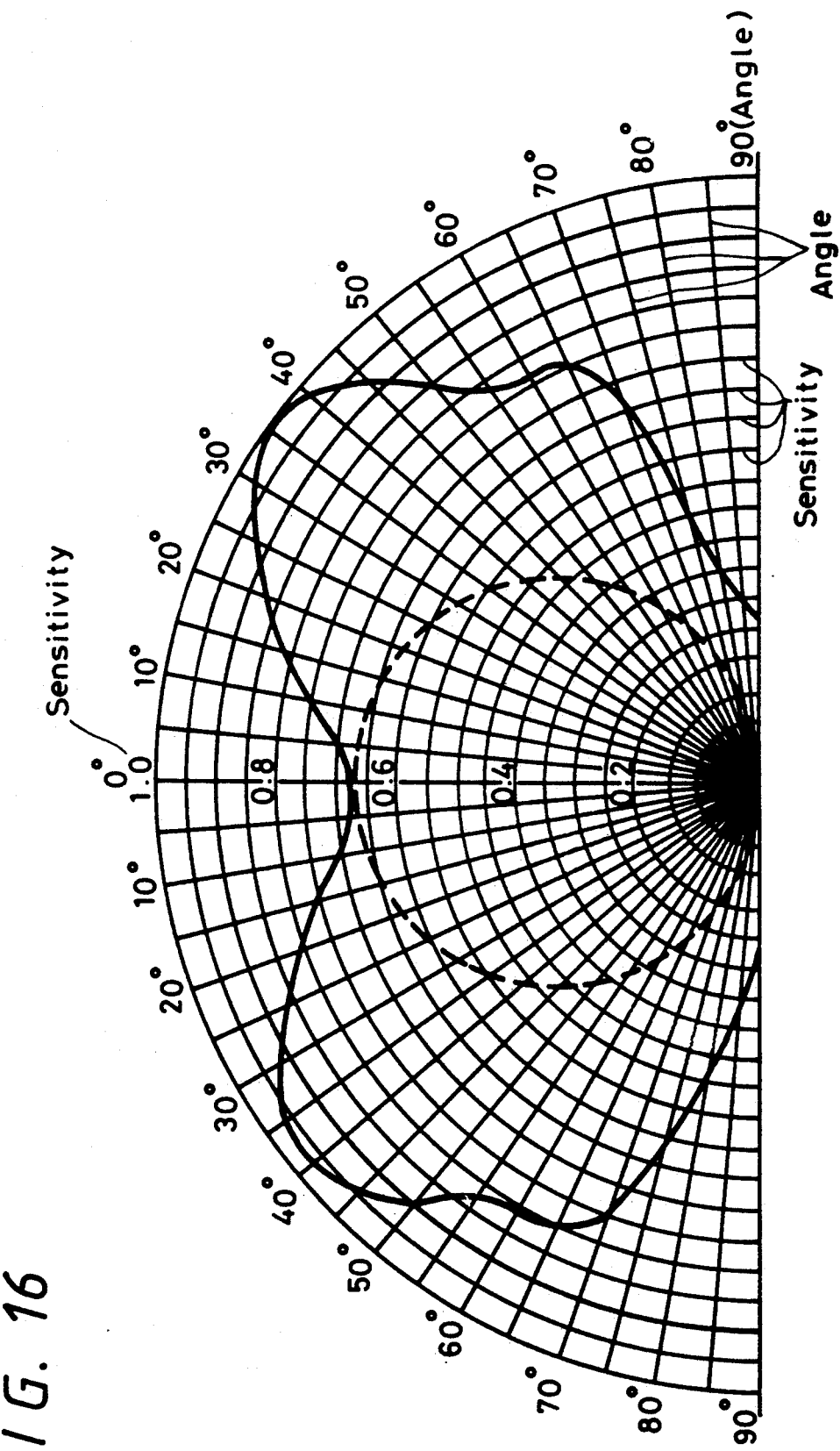
FIG. 16 is a graph illustrating a directivity characteristic of the optical reception apparatus, and to which references will be made in explaining the second embodiment of the optical reception apparatus according to the present invention.

Also in this embodiment, the directivity characteristic of the optical reception apparatus 121 is the important problem as earlier noted. In the optical reception apparatus 121 shown in FIG. 14, because the front portion of the light receiving element 1C is formed as the prism portion 50 and the reflector 104 whose inner surface is formed as the mirror surface portion 104a is provided so as to surround the molding member 100 including the prism 50, the light signal from the direction displaced from the front axis of the light receiving element 1C is reflected by the reflector 104, introduced into the prism 50 by means of the reflector 104 and further introduced through the prism 50 into the light receiving element 1C. Accordingly, as shown by a solid line in FIG. 16, the directivity characteristic of the optical reception apparatus 121 is considerably widened and improved as compared with the directivity characteristic (shown by a broken line in FIG. 16) of a light receiving portion utilized by a conventional speaker system or the like. When the optical reception apparatus 121 of this embodiment is applied to cordless appliances, such as the cordless microphone system as shown in FIG. 15, then it is possible to alleviate restrictions imposed upon the space factor of the cordless appliance and the layout of the light emitting portion and the light receiving portion. Further, in the above cordless microphone system, regardless of the change of angle at which the user 124 holds the microphone 125, the audio signal emitted as the light signal from the light emitting portion 125a of this microphone 125 can be received satisfactorily by the light receiving apparatus 121.

Figure 17:
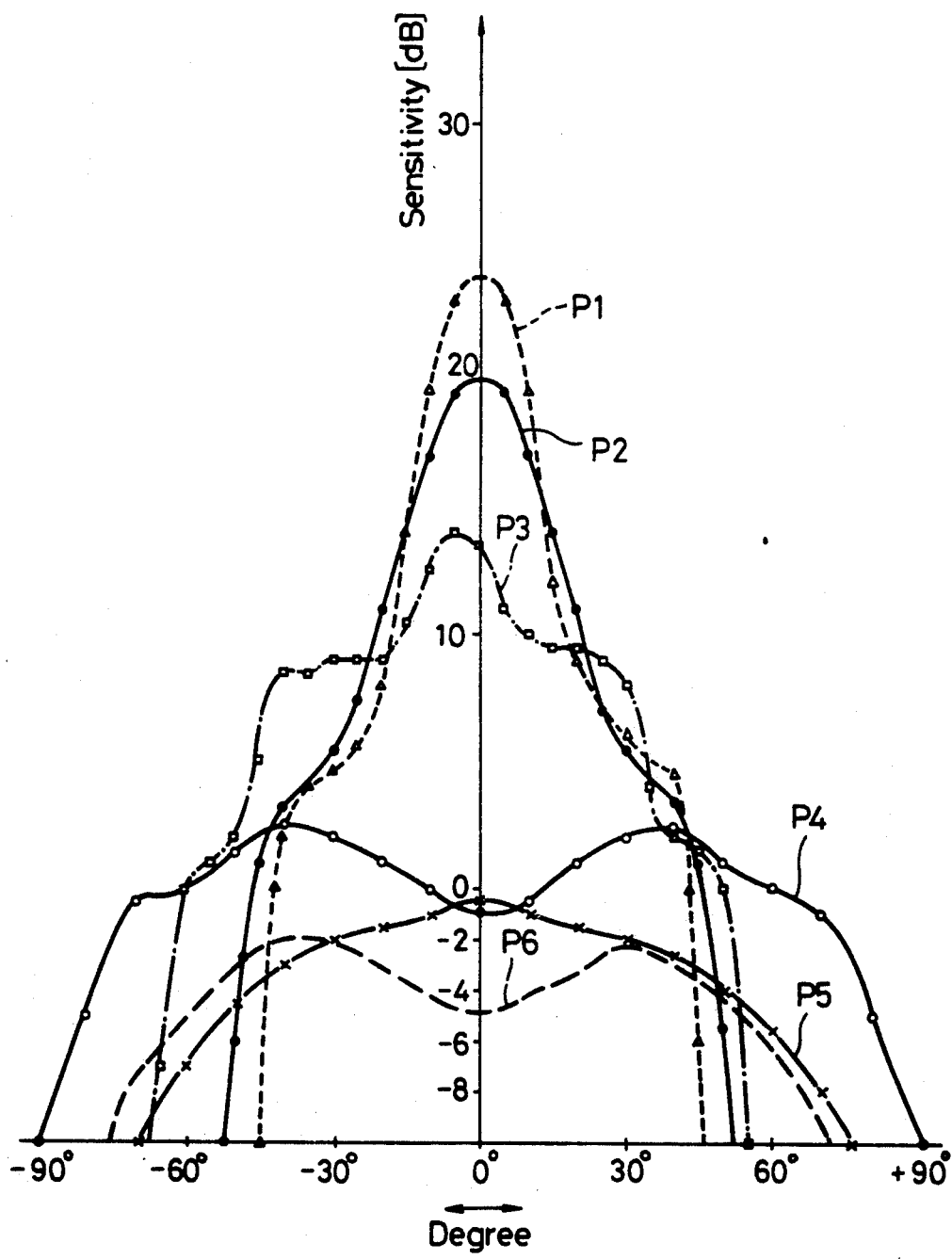
FIG. 17 is a graph illustrating a relation between the arrangement of the optical reception apparatus and the sensitivity, and to which references will be made in explaining the second embodiment of the optical reception apparatus according to the present invention.

FIG. 17 is a graph showing a light receiving sensitivity versus the rotational angle in which the light receiving device 1 receives the light signal when the arrangement of the above optical reception apparatus 121 is changed variously.

In FIG. 17, P1 represents sensitivity measured when the diameter of the opening portion of the reflector 104 of the above optical reception apparatus 121 is selected to be φ50 (50 mm) and when the angle (vertex angle) of the reflector 104 is selected in a range of from 55 to 60 degrees. According to the measured results shown by P1, when the rotational direction angle is zero degree (corresponding to the front axis) the sensitivity is considerably high as compared with others, while when the rotational direction angle is increased, the sensitivity is narrow as compared with others.

A P2 also represents sensitivity measured when the diameter of the opening portion of the reflector 104 of the above optical reception apparatus 121 is selected to be φ25 (25 mm) and when the angle (vertex angle) of the reflector 104 is selected to be 60 degrees. According to the measured results shown by P2, when the rotational direction angle is zero degree, the sensitivity is slightly low as compared with that of P1 when the rotational direction angle is increased, the sensitivity is slightly wide as compared with that of P1.

A P3 also represents sensitivity measured when the diameter of the opening portion of the reflector 104 of the above optical reception apparatus 121 is selected to be φ55 (55 mm) and when the angle (vertex angle) of the reflector 104 is selected to be 90 degrees. According to the measured results shown by P3, when the rotational direction angle is zero degree, the sensitivity is considerably low as compared with that of P2, while then the rotational direction angle is increased, the sensitivity is slightly wide as compared with that of P2.

Figure 2:
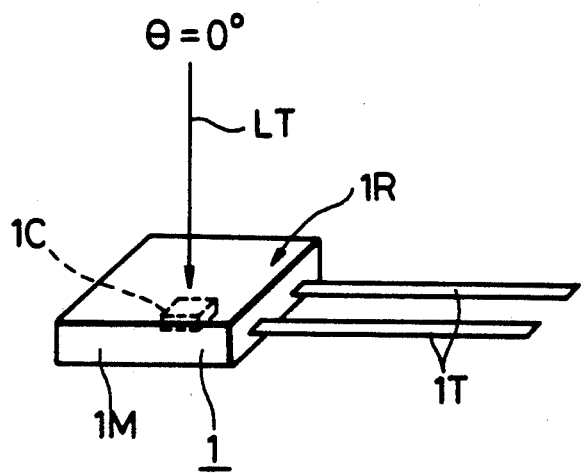
FIG. 2 is a perspective view illustrating an example of a conventional light receiving device.
Figure 3:
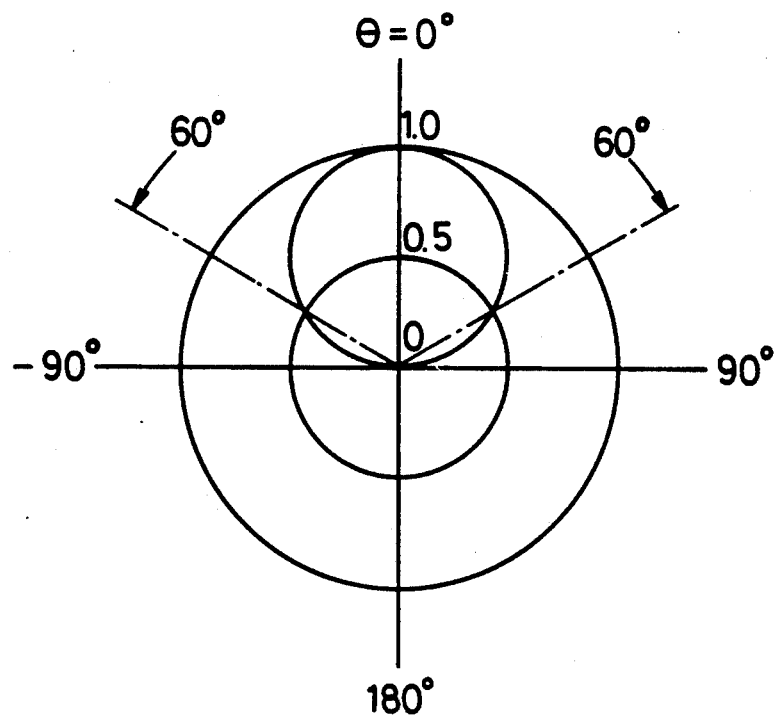
FIG. 3 is a characteristic diagram used to explain the conventional light receiving device shown in FIG. 2.
Figure 4:
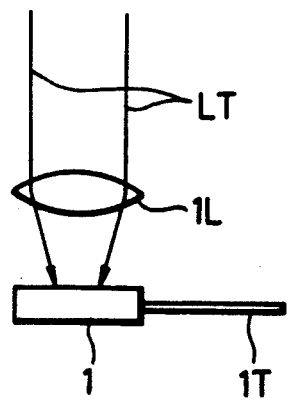
FIG. 4 is a side view of other example of the conventional light receiving device.
Figure 5:
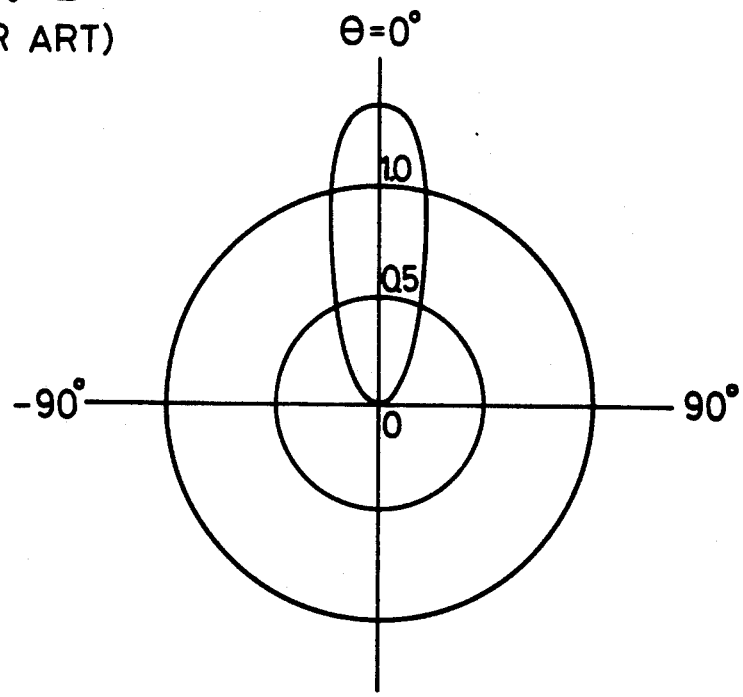
FIG. 5 is a characteristic diagram used to explain the conventional light receiving device shown in FIG. 4.

A P5 shows a relation between light receiving sensitivity and rotational angle brought about by the optical reception apparatus utilizing the light receiving device shown in FIG. 2. According to the measured results shown by P5, when the rotational direction angle is zero, the sensitivity is considerably low as compared with that of P3, but when the rotational direction angle is increased, the sensitivity is considerably wide as compared with that of P3. Further, as shown by the graph of FIG. 17, the sensitivity is gradually lowered respectively when the rotational angle is increased in the plus and minus directions from the rotational direction angle zero degree and forms a substantially semi-circular shape.

A P4 in the graph of FIG. 17 shows sensitivity measured when the reflector 104 of the above optical reception apparatus 121 is removed and the molding member 100 directly receives the light. According to the measured results shown by P4, when the rotational direction angle is zero, the sensitivity is substantially the same as that of P5 and when the rotational direction angle is increased, the sensitivity is considerably widened as compared with that of P5. Further, as shown in the graph of FIG. 17, it is to be noted that the sensitivity is gradually increased respectively when the rotational direction angle is increased in the plus and minus directions from the direction in which the rotational direction angle is zero degree.

A P6 shows a relation between the sensitivity and rotational direction of the optical reception apparatus shown in FIG. 8. According to the measured results shown by P6 in FIG. 17, when the rotational direction angle is zero, the sensitivity is low, and when the angle of the rotational direction is increased, the sensitivity is substantially the same as that of P5 which presents the characteristic of the conventional optical reception apparatus. The reason for this is that a reflection occurs on a boundary surface between the prism 50 and the shielding member 1M.

As will be clear from the graph of FIG. 17, in this embodiment, when the optical reception apparatus in which the prism 50 different from the light receiving element 1C is bonded to the front surface of the light receiving element 1C is employed (corresponding to FIG. 8), the light receiving characteristic of this embodiment can be considerably improved as compared with that of the conventional optical reception apparatus utilizing the light receiving device 1 having no prism provided.

As will be clear from the graph of FIG. 17, when the optical reception apparatus having the molding member 100 including the prism 50 and the shielding member 1M which are molded unitarily is employed, the light receiving characteristics can be further improved as compared with the optical reception apparatus in which the prism independent from the light receiving device is bonded to the front of the light receiving device (corresponding to FIG. 8).

Further, when the optical reception apparatus in which the reflector 104 of circular cone configuration is provided so as to surround the molding member 100 is employed, then the light receiving characteristic thereof can be improved more than the optical reception apparatus utilizing the molded molding member 100 having no reflector 104 provided.

Figure 18:
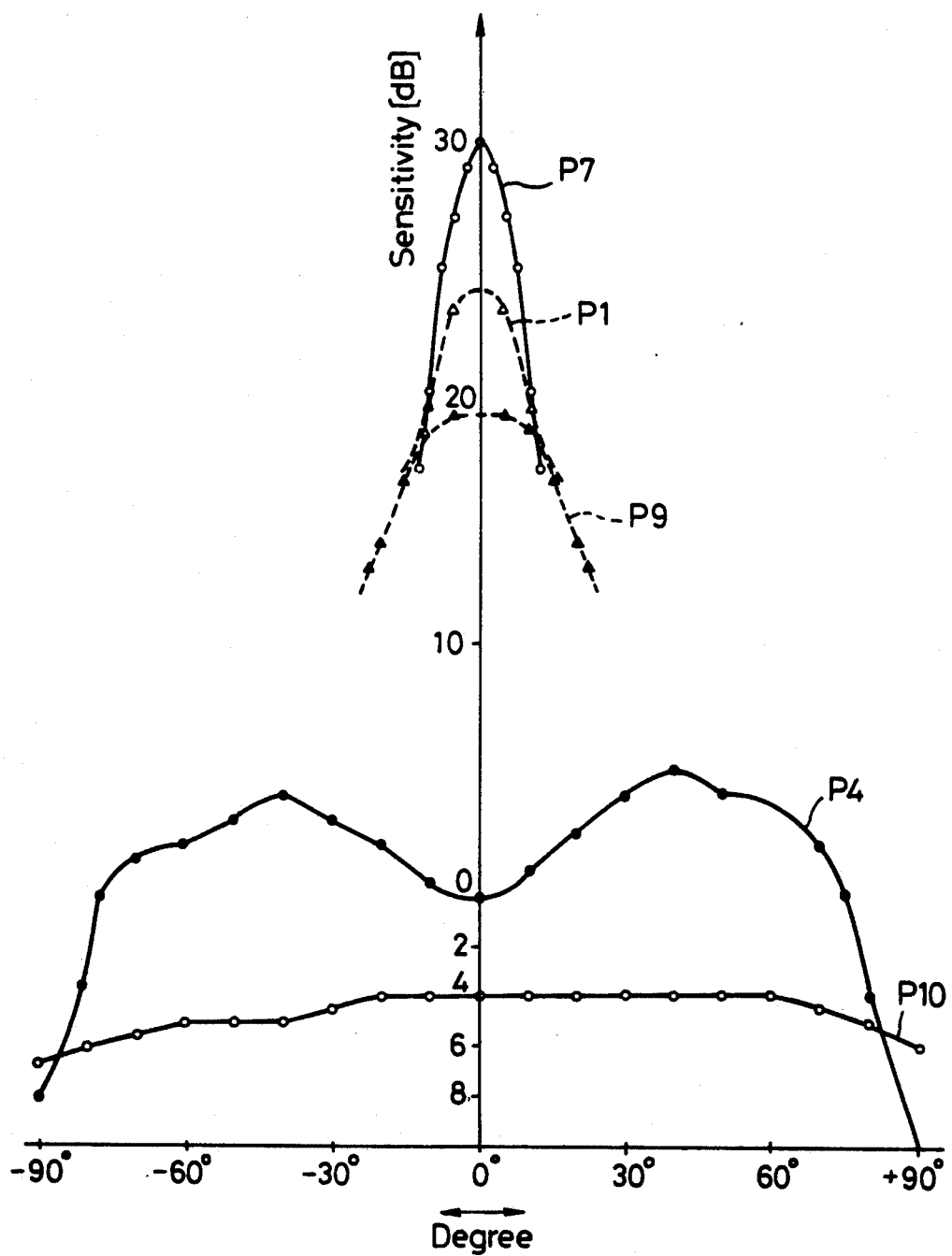
FIG. 18 is a graph illustrating a relation between the arrangement of the optical reception apparatus and the sensitivity, and to which references will be made in explaining the second embodiment of the optical reception apparatus according to the present invention.

FIG. 18 is a graph similar to the graph of FIG. 17 and shows light receiving sensitivity in the rotational direction when the light receiving element 1 receives a light signal under the condition that the arrangement of the above optical reception apparatus 121 or the light receiving element 1 is changed variously. In FIG. 18, like parts corresponding to those of FIG. 17 are marked with the same references and therefore need not be described in detail. In FIG. 18, P1 and P4 are respectively similar to P1 and P4 shown in FIG. 17.

In FIG. 18, P7 represents sensitivity measured when the reflector 104 of the above optical reception apparatus 121 is replaced with a parabola mirror having an opening portion diameter of φ43 (43 mm). According to the measured results shown by P7 in FIG. 18, the sensitivity provided when the rotational direction angle is zero degree (corresponding to the front axis) is considerably high (substantially +30 dB) as compared with that of P1 while when the rotational direction angle thereof is increased the sensitivity is narrow as compared with others.

A P9 represents a light receiving characteristic of an optical reception apparatus which utilizes a photodiode having a shielding member of a convex lens configuration molded therewith. According to the measured results shown by P9, it is to be noted that the sensitivity measured when the rotational direction angle is zero degree is lower than that of P1.

Figure 6:
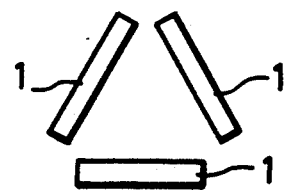
FIG. 6 is a plan view of a further example of the conventional light receiving device.
Figure 7:
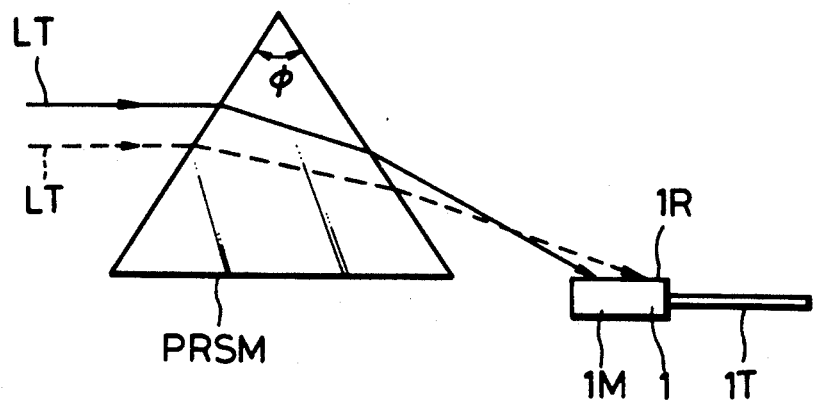
FIG. 7 is a schematic diagram used to explain a principle of the optical reception apparatus according to the present invention.

A P10 represents a light receiving characteristic of an optical reception apparatus in which three light receiving devices 1 shown in FIG. 6 are utilized so as to widen the light receiving range. According to the measured results shown by P10 in FIG. 18, the sensitivity measured when the rotational direction angle is zero degree is considerably low (substantially −4 dB) as compared with others while when the rotational direction angle is increased, the sensitivity is considerably widened.

As will be clear from FIG. 17, when the reflector 104 of the optical reception apparatus 121 in this embodiment is replaced with the parabola mirror, the sensitivity can be considerably increased as compared with the light receiving characteristic (P4) measured when the diameter of the opening portion of the reflector 104 of the optical reception apparatus 121 is selected to be φ50 (50 mm) and when the vertex angle thereof is selected in a range of from 55 degrees to 60 degrees.

Figure 19:
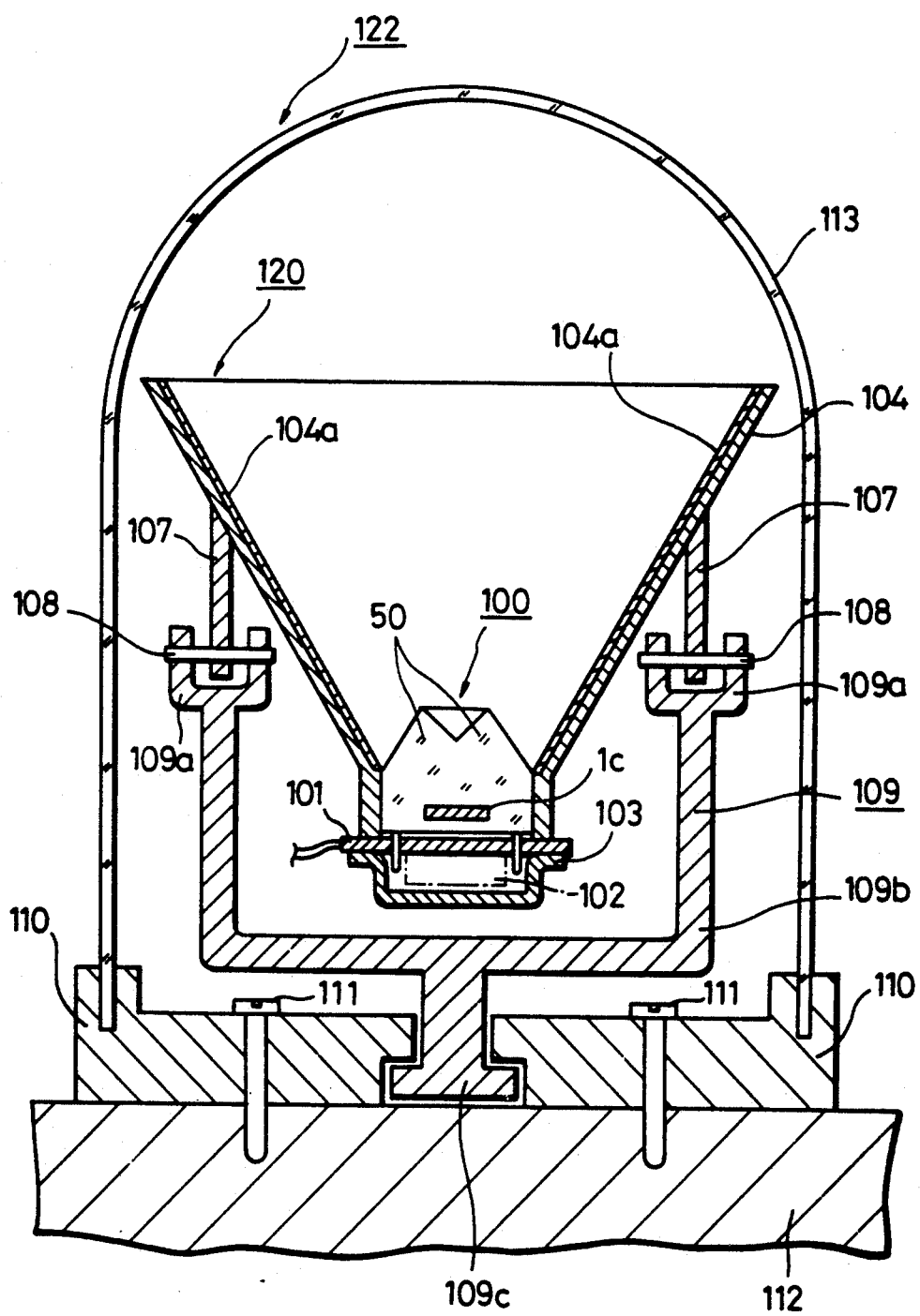
FIG. 19 is a cross-sectional view illustrating a third embodiment of the optical reception apparatus according to the present invention.

FIG. 19 shows another embodiment of the optical reception apparatus for receiving a light signal according to the present invention. In FIG. 19, like parts corresponding to those of FIG. 14 are marked with the same references and therefore need not be described in detail.

As shown in FIG. 19, supporting members 107 are respectively mounted to the two places of, for example, the outside of the reflector 104 of the optical reception apparatus body 120. Further, shafts 108 are respectively attached to the underside of the supporting members 107 and these shafts 108 are rotatably mounted to joint portions 109a formed at the top portions of arm members 109b of brackets 109.

The lower portion of the bracket 109 is formed as a shaft 109c. Although the top and bottom of the optical reception apparatus body 120 are reversed in FIG. 19, the shaft 109c is fitted into an attaching member 110 and the attaching member 110 is secured to a ceiling 120 by screws 111, whereby the optical reception apparatus body 120 is allowed to hang from the ceiling 12. Thus, the light receiving apparatus body 120 attached to the bracket 109 becomes rotatable within the horizontal plane parallel to the ceiling 112. In FIG. 19, reference numeral 113 designates a cover which also serves as a filter, and the cover 113 is attached at its opening portion side to the attaching member 110 to form an optical reception apparatus 122.

Since the optical reception apparatus 122 shown in FIG. 19 includes the optical reception apparatus body 120 similar to that of the optical reception apparatus 121 shown in FIG. 14 and this optical reception apparatus body 120 is arranged to be rotatable in the horizontal and vertical planes, this optical reception apparatus 122 has not only the directivity characteristic of the optical reception apparatus 121 shown in FIG. 14 but also a wide directivity characteristic added to the former directivity characteristic. Furthermore, the angle of the optical reception apparatus body 120 within the horizontal and vertical planes can be changed in accordance with the place where the optical reception apparatus 122 is located, thus making it possible to locate the optical reception apparatus 122 at the position in which the optical reception apparatus 122 can receive the light signal in the best light receiving condition.

When the optical reception apparatus 122 shown in FIG. 19 is applied to the cordless microphone system shown in FIG. 15, as compared with the optical reception apparatus 121 shown in FIG. 14, the optical reception apparatus 122 can receive more satisfactorily the audio signal provided as the light signal from the light emitting portion 125a of the microphone 125.

Further, in this optical reception apparatus 122, a drive means for rotating the optical reception apparatus body 120 within, for example, the horizontal and vertical planes and a control means for controlling the drive means may be provided and the control means may control the drive means in accordance with the light receiving condition, thereby the optical reception apparatus body 120 being placed in the optimum light receiving position. Also in this embodiment, the above reflector 104 may be replaced with the parabola mirror.

According to the present invention as described above, since the signal light emitted from the direction displaced from the front axis of the light receiving element becomes incident on the light receiving element through the prism, the optical reception apparatus can be made non-directional for receiving the light by the simple arrangement from a stereoscopic standpoint. Therefore, in a variety of cordless appliances to which the light signal optical reception apparatus is applied, the problem of the place in which these cordless appliances are located can be solved. Also, in these cordless appliances, information can be satisfactorily transmitted between the information transmitting side and the information receiving side.

Furthermore, according to the present invention as described above, since the signal light emitted from the direction displaced from the front axis of the light receiving element becomes incident on the light receiving element through the prism and since the signal light from the direction displaced from the front axis of the light receiving element is introduced into the prism of this light receiving element by the reflection of the mirror surface portion and then introduced into the light receiving element through the prism, the optical reception apparatus can be made non-directional for receiving the light by the simple arrangement from a stereoscopic standpoint. Therefore, in a variety of cordless appliances to which the light signal optical reception apparatus is applied, the problem of the place in which these cordless appliances are located can be solved. Also, in these cordless appliances, information can be satisfactorily transmitted between the information transmitting side and the information receiving side.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. An optical reception apparatus for receiving a light signal comprising:
    a prism made by forming a caldera-shaped concave portion in a central portion of a circular mountain configuration made of a transparent material; and
    a light receiving element located at a bottom portion of said mountain portion on a central axis of the caldera-shaped concave portion.

2. An optical reception apparatus according to claim 1 further comprising a shielding member for shielding said light receiving element, said shielding member being unitarily molded with said prism by means of a molding-process of said transparent material.

3. An optical reception apparatus according to claim 1 further comprising a reflector formed on an upper portion of said prism, said reflector reflecting light onto said light receiving means and having an opening portion diameter that gradually increases towards the top thereof.

4. An optical reception apparatus according to claim 1 further comprising a parabola mirror formed on an upper portion of said prism for reflecting light onto said light receiving element.

5. An optical reception apparatus comprising:
    a prism made of transparent material and shaped substantially as the frustum of a circular cone, said prism having a concave portion shaped substantially as a circular cone whose diameter is gradually reduced in the direction from a small diameter circular outer side surface to large diameter circular outer side surface of said frustum of a circular cone; and
    a light receiving element mounted on said prism at its position along a center line of a circle of said large diameter circular outer side surface and also in the vicinity of said large diameter circular outer side surface.

6. An optical reception apparatus comprising:
    a prism made of a transparent material and shaped substantially as the frustum of a circular cone, said prism having a concave portion shaped substantially as a frustum of a circular cone whose diameter is gradually reduced in the direction from a small diameter circular outer side surface to a large diameter circular outer side surface of said frustum of a circular cone; and
    a light receiving element mounted on said prism at its position along a center line of a circle of said large diameter circular outer side surface and also in the vicinity of said large diameter circular outer side surface.

* * * * *

UNITED STATES PATENT AND TRADEMARK OFFICE
CERTIFICATE OF CORRECTION

PATENT NO. : 5,159,188
DATED : October 27, 1992
INVENTOR(S) : Kensaku Abe, Yukimasa Yamaguchi & Nobuo Kobayashi It is certified that error appears in the above-indentified patent and that said Letters Patent is hereby corrected as shown below:

```
                          Title page, item [57],
In the Abstract, line 1, delete "of"
Col. 1, line 25, delete "to"
Col. 2, line 21 & 22, change "can-celed" to --can-celled--
Col. 3, line 17, change "M" to --1M--
Col. 4, line 21, delete "of" first occurrence
        line 28, delete "of"
Col. 5, line 66, delete "of" first occurrence
Col. 8, line 27, change "IC" to --1C--
Col. 9, line 49, after "amplifiers)" insert --and--
        line 50, change "121," to --121;--
Col. 12, line 45, change "12" to --112--

Col. 14, line 35, after "to" insert --a--
```

Signed and Sealed this

Twenty-eighth Day of June, 1994

BRUCE LEHMAN

Attest:

Attesting Officer

Commissioner of Patents and Trademarks